United States Patent
Takeuchi et al.

(10) Patent No.: US 7,737,897 B2
(45) Date of Patent: Jun. 15, 2010

(54) PORTABLE WIRELESS APPARATUS

(75) Inventors: Akiyoshi Takeuchi, Ishikawa (JP); Yutaka Saito, Ishikawa (JP); Kouta Aoki, Kanagawa (JP)

(73) Assignee: Panasonic Corporation, Kadoma-shi (JP)

( * ) Notice: Subject to any disclaimer, the term of this patent is extended or adjusted under 35 U.S.C. 154(b) by 0 days.

(21) Appl. No.: 11/815,312

(22) PCT Filed: Feb. 1, 2006

(86) PCT No.: PCT/JP2006/301687
§ 371 (c)(1),
(2), (4) Date: Sep. 17, 2008

(87) PCT Pub. No.: WO2006/082860
PCT Pub. Date: Aug. 10, 2006

(65) Prior Publication Data
US 2009/0033562 A1 Feb. 5, 2009

(30) Foreign Application Priority Data
Feb. 1, 2005 (JP) ............................. 2005-025007

(51) Int. Cl.
*H01Q 1/24* (2006.01)
(52) U.S. Cl. ...................................... 343/702
(58) Field of Classification Search ............... 343/702, 343/745, 748, 850; 455/575.7
See application file for complete search history.

(56) References Cited

U.S. PATENT DOCUMENTS

| | | | |
|---|---|---|---|
| 6,978,165 B2 * | 12/2005 | Martinez et al. | 455/575.7 |
| 7,479,927 B2 * | 1/2009 | Scarpelli | 343/702 |
| 2004/0130442 A1 * | 7/2004 | Breed et al. | 340/443 |
| 2006/0121933 A1 * | 6/2006 | Ikeda | 455/550.1 |
| 2009/0128424 A1 * | 5/2009 | Suzuki et al. | 343/702 |

FOREIGN PATENT DOCUMENTS

| | | |
|---|---|---|
| EP | 1755190 A1 | 2/2007 |
| JP | 06-216621 | 8/1994 |
| JP | 07-023450 | 1/1995 |
| JP | 10-190330 | 7/1998 |
| JP | 2001-156898 | 6/2001 |
| JP | 2002-335180 | 11/2002 |
| JP | 2002-353719 | 12/2002 |

(Continued)

*Primary Examiner*—Huedung Mancuso
(74) *Attorney, Agent, or Firm*—Christensen O'Connor Johnson Kindness PLLC (57) ABSTRACT

The present invention provides a folding type and portable wireless apparatus with a built-in antenna, particularly a portable wireless apparatus that reduces a local average SAR and improves performance of antenna.

A housing open/close detecting unit 6 detects open/close of bodies 1 and 2. When the bodies 1 and 2 are open, a first antenna 4 and a wireless circuit 24 are connected and resonant frequency of a second antenna 5 is adjusted into a first frequency bandwidth, and when the bodies 1 and 2 are closed, the resonant frequency of the second antenna 5 is adjusted into the first frequency bandwidth and a second frequency bandwidth and a wireless circuit 24 is connected. Therefore, when the bodies 1 and 2 are open, it is possible to reduce a local average SAR by separating an antenna current. Further, when the bodies 1 and 2 are closed, it is possible to obtain a high antenna gain.

3 Claims, 5 Drawing Sheets

FOREIGN PATENT DOCUMENTS

| JP | 2002-368850 | 12/2002 |
|----|-------------|---------|
| JP | 2002-368850 A | 12/2002 |
| JP | 2003-204281 | 7/2003 |
| JP | 2004229048 A | 8/2004 |
| JP | 2004-274730 | 9/2004 |
| JP | 2004-274730 A | 9/2004 |

* cited by examiner

PORTABLE WIRELESS APPARATUS

TECHNICAL FIELD

The present invention relates to a folding type mobile phone that has a foldable mechanism in which an upper housing and a lower housing are coupled to each other through a hinge portion, and more particularly, so as to a portable wireless apparatus that reduces a local average SAR (Specific Absorption Rates) with a high antenna gain.

BACKGROUND ART

A mobile phone has been commonly spread and particularly, a folding type mobile phone having a foldable mechanism in which an upper housing and a lower housing are coupled to each other through a hinge portion has been widely spread in recent years. Folding type mobile phone generally have two postures of an opened posture and a closed posture, and has two advantages of being capable of enlarging a display screen when they are used in the opened state (in the opened posture) and thus improving usability, and of being capable of being transformed to a compact profile when they are used in the closed state (in the closed posture) and thus providing a portable convenience.

Recently, users have had more interest in the local average SAR and have a tendency to select mobile phones with a low local average SAR, using the local average SAR as an index of selection. Therefore, it is preferable for mobile phones to have a low local average SAR. A method of reducing the local average SAR have been known in the art, in which an electrical conductive metal element with an end open is connected (grounded) to a gland adjacent to a power feeding point in an unbalance-typed power feeding antenna and the element is set in a length to resonate at a desired frequency. Further, the element is disposed opposite to the side with opening of the receiving part of the housing that contacts the human housing. According to this configuration, current flows from the power feeding point to the electrical conductive metal element, so that it is possible to reduce the current flowing to the side that contacts the human housing (see Patent Document 1).

Further, according to another method of separating a current of a power feeding point in the art, a shield case of an upper housing with a receiving part in a folding type mobile phone is used as an antenna element (antenna 1), power is supplied to the antenna element through a flexible cable from a gland substrate of a lower housing, and a rod antenna (antenna 2) is connected with a power feeding portion (see Patent Document 2).

Figure 4A:
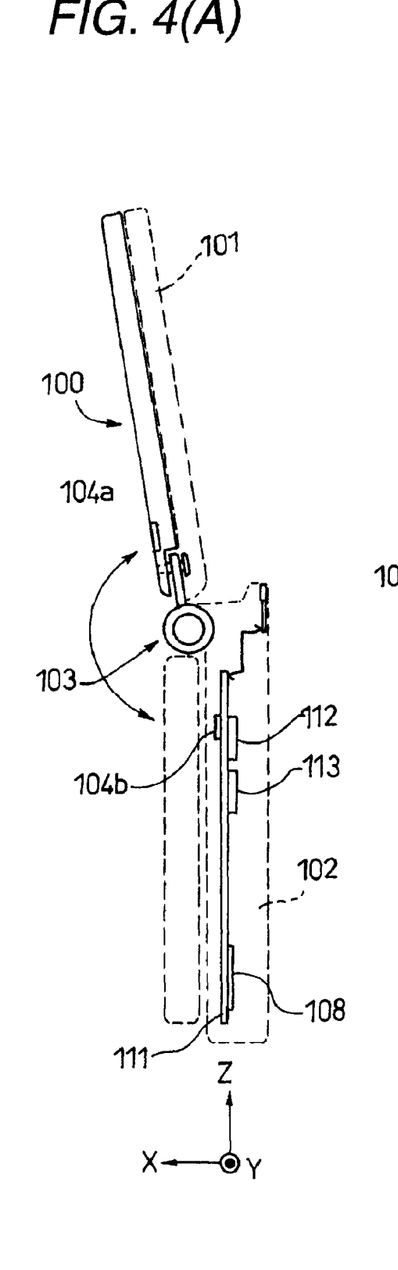
FIG. 4A is a side view illustrating a portable wireless apparatus that is open in the related art and FIG. 4B is a plan view illustrating the portable wireless apparatus that is open in the related art.
Figure 4B:
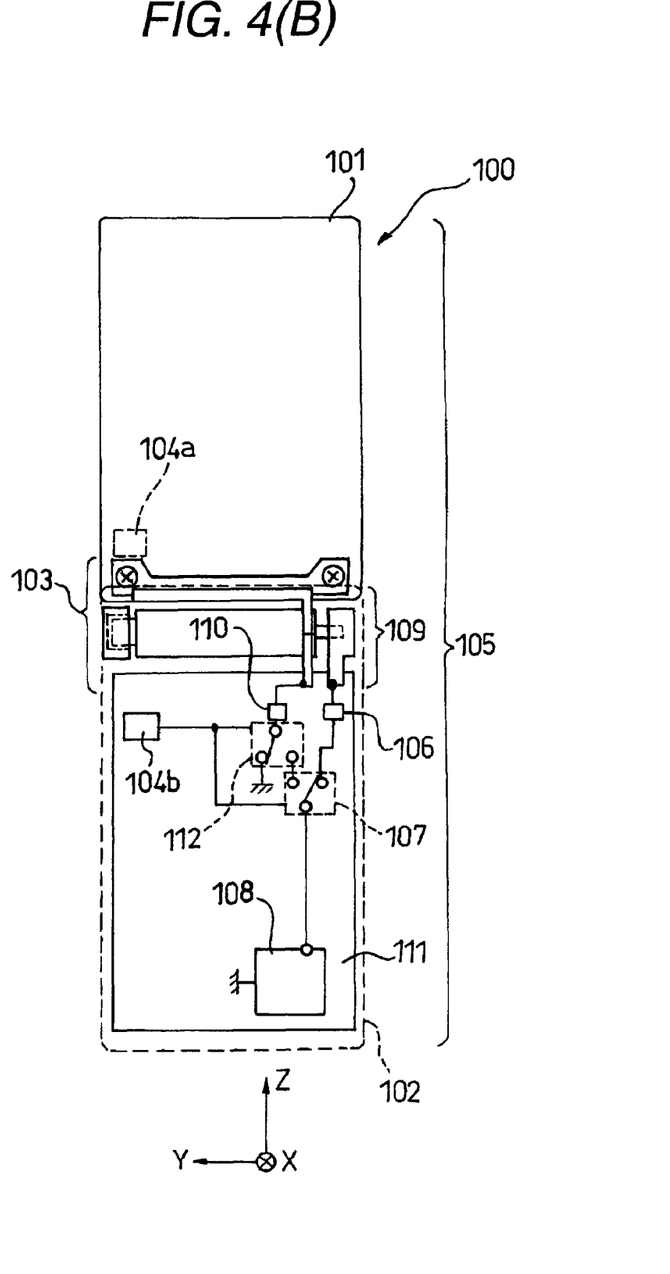
Figure 5A:
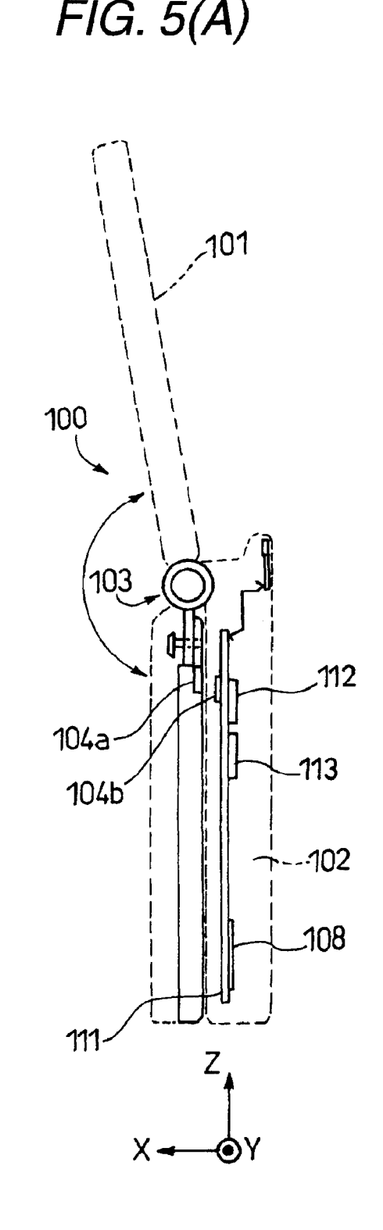
FIG. 5A is a side view illustrating a portable wireless apparatus that is closed in the related art and FIG. 5B is a plan view illustrating the portable wireless apparatus that is closed in the related art.
Figure 5B:
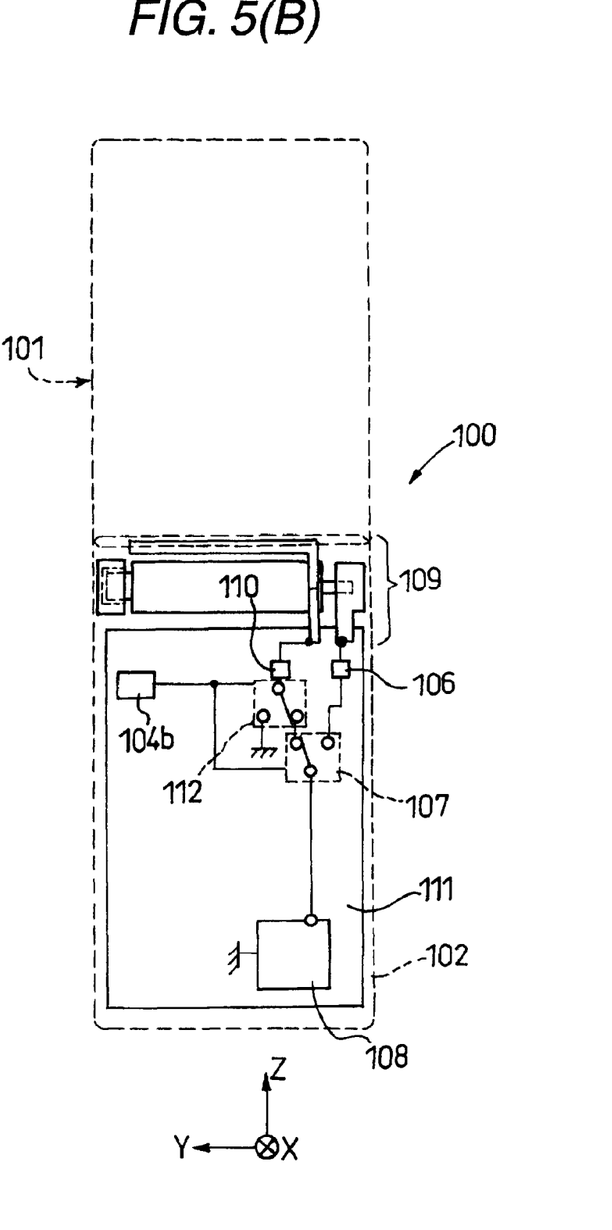

Configurations in the related art are shown in FIGS. 4 and 5. FIG. 4 shows a configuration with the housing open in the related art and FIG. 5 shows a configuration with the housing closed in the related art.

According to the examples in the related art shown in FIGS. 4 and 5, for example, according to Patent Document 1, an electrical conductive metal element with an end open is disposed adjacent to a hinge portion 103 that supports an upper housing 101 and a lower housing 102 of a folding type mobile phone 100 such that they are capable of opening/closing, and housing open/close detecting unit 104a, 104b that detects open/close of the bodies are provided. When it is detected that the bodies 101 and 102 are open, as shown in FIG. 4, a first matching circuit 106 connected with a first antenna 105 is connected to a wireless circuit 108 through an antenna switching circuit 107 and a second antenna 109 is connected to a gland pattern of a circuit board 111 through a switching circuit 110. Further, when it is detected that the bodies 101 and 102 are closed, as shown in FIG. 5, the second antenna 109 is connected to the wireless circuit 108 through a switching circuit 112 and an antenna switching circuit 113.

As described above, when the bodies 101 and 102 are opened, it is possible to reduce the local average SAR by separating the antenna current of the first antenna 105 to the second antenna 109. Further, resonant frequency of the second antenna 109 and the matching circuit 106 is constant at the transmitting frequency and the receiving frequency, regardless of the open/closed of the bodies 101 and 102.

Patent Document 1: JP-A-2002-353719
Patent Document 2: JP-A-2002-335180

DISCLOSURE OF THE INVENTION

Problem that the Invention is to Solve

However, according to the above technology that reduces the local average SAR in the related art, it is needed to additionally provide an electrical conductive metal element in the housing, which decreases the effect reducing the local average SAR due to an electromagnetic connection of the metal components in the housing.

Further, according to the above technology that separates the current of a power feeding point in the related art, it is needed to protrude the rod antenna outside the housing, so that it is difficult to achieve a built-in antenna and obtain a high antenna gain without optimizing radiation characteristics for telephone conversation.

Further, according to a folding type mobile phone, in an antenna in the related art in which an earth wire is disposed adjacent to a hinge portion, and an electrical conductive metal element with an end open to the hinge portion is connected to a gland when the housing is open, resonance of the electrical conductive metal element with an end open to the hinge portion is not optimized at a transmitting frequency and it is difficult to decrease the effect that reduces the local average SAR.

The invention has been made to solve the above problems, and it is an object of the invention to provide a portable wireless apparatus that reduces a local average SAR and improves performance of an antenna, particularly in a built-in antenna of a folding type and portable wireless apparatus.

Means for Solving the Problem

According to the invention, there is provided a portable wireless apparatus with a first housing and a second housing pivotably connected by a hinge portion, in which: the first housing includes a first antenna element, the second housing includes a second antenna element, a circuit board with a gland pattern, and a second power feeding portion provided at an end of the second antenna element, the hinge portion includes a first hinge portion and a second hinge portion that are made of an electrical conductive metal and a connecting portion that electrically connects the first hinge portion with the second hinge portion and rotatably supports the first and second hinge portions, the first hinge portion is electrically connected to the hinge portion-sided end of the first antenna element of the first housing, and the second hinge portion is disposed at a predetermined distance from the gland pattern on the circuit board of the second housing and provided with a first power feeding portion, the portable wireless apparatus including: an antenna switching circuit that selectively connects one of the first antenna element and the second antenna element to a wireless circuit; a resonance circuit and a second matching circuit that are selectively connected to the second antenna element; a switching circuit that connects the second power feeding portion with one of the resonance circuit and the second matching circuit; and an open/close detecting unit that detects open/close of the first housing and the second housing, wherein the antenna switching circuit selects the first antenna element while the switching circuit selects the resonance circuit, when the first housing and the second housing are open, and wherein the antenna switching circuit selects the second antenna element while the switching circuit selects the matching circuit and power is supplied through the matching circuit, when the first housing and the second housing are closed.

According to the above configuration, when the first housing and the second housing are open, the antenna switching circuit selects the first antenna element and the first antenna element is connected to the wireless circuit while the switching circuit selects the resonance circuit and the second antenna is connected to the resonance circuit. Further, when the first housing and the second housing are closed, the antenna switching circuit selects the second antenna element and the second antenna element is connected to the wireless circuit while the switching circuit selects the matching circuit and power is supplied thorough the matching circuit. Therefore, for the built-in antenna of the housing, it is possible to separate the antenna current and reduce the local average SAR with a high antenna gain.

Further, according to a portable wireless apparatus of the invention, the resonance circuit is set such that the second antenna element connected with the resonance circuit resonates in a first frequency bandwidth, when the first housing and the second housing are open. Further, the matching circuit is set such that the second antenna element resonates in the first frequency bandwidth and a second frequency bandwidth, when the first housing and the second housing are closed.

For example, the first frequency bandwidth corresponds to the transmitting frequency and the second frequency bandwidth corresponds to the receiving frequency.

According to the above configuration, since the resonance circuit is set such that the second antenna element connected with the resonance circuit resonates in the first frequency bandwidth (transmitting frequency), when the first housing and the second housing are open, the antenna current in the transmitting bandwidth that flows to the first antenna element is separated to the second antenna element and the antenna current is spaced away from a human housing. Therefore, it is possible to reduce the local average SAR. Further, since the matching circuit is set such that the second antenna element resonates in the first frequency bandwidth (transmitting frequency) and the second frequency bandwidth (receiving frequency), when the first housing and the second housing are closed, it is possible to ensure high performance of antenna for the transmitting frequency and the receiving frequency.

Advantage of the Invention

According to a portable wireless apparatus of the invention, when the first housing and the second housing are open, the first antenna element and the wireless circuit are connected while the second antenna element is connected to the resonance circuit. Further, when the housing is closed, the second antenna element and the wireless circuit are connected. Accordingly, it is possible to separate the antenna current and reduce the local average SAR, when the housing is open, and it is also possible to obtain a high antenna gain, when the housing is closed.

REFERENCE NUMERALS

1: UPPER HOUSING (FIRST HOUSING)
2: LOWER HOUSING (SECOND HOUSING)
3: HINGE PORTION
4: FIRST ANTENNA (FIRST ANTENNA ELEMENT)
5: SECOND ANTENNA
6: HOUSING OPEN/CLOSE DETECTING UNIT
7: METAL FRAME
8: FIRST POWER FEEDING CLASP (FIRST POWER FEEDING PORTION)
9: CIRCUIT BOARD
10: HINGE CLASP (FIRST HINGE PORTION)
11: FIXING SCREW
12: CYLINDRICAL CONDUCTOR
13: ROTARY SHAFT (SECOND HINGE PORTION)
14: SUPPORT SHAFT
15: FIRST MATCHING CIRCUIT
16: SECOND ANTENNA ELEMENT
17: SECOND POWER FEEDING CLASP (SECOND POWER FEEDING PORTION)
18: SECOND MATCHING CIRCUIT (MATCHING CIRCUIT)
19: RESONANCE CIRCUIT
20: ANTENNA SWITCHING CIRCUIT
21: SWITCHING CIRCUIT
22: PERMANENT MAGNET
23: HALL ELEMENT
24: WIRELESS CIRCUIT

BEST MODE FOR CARRYING OUT THE INVENTION

Preferred embodiments of the invention will be described hereafter with reference to the accompanying drawings.

First Embodiment

Figure 1A:
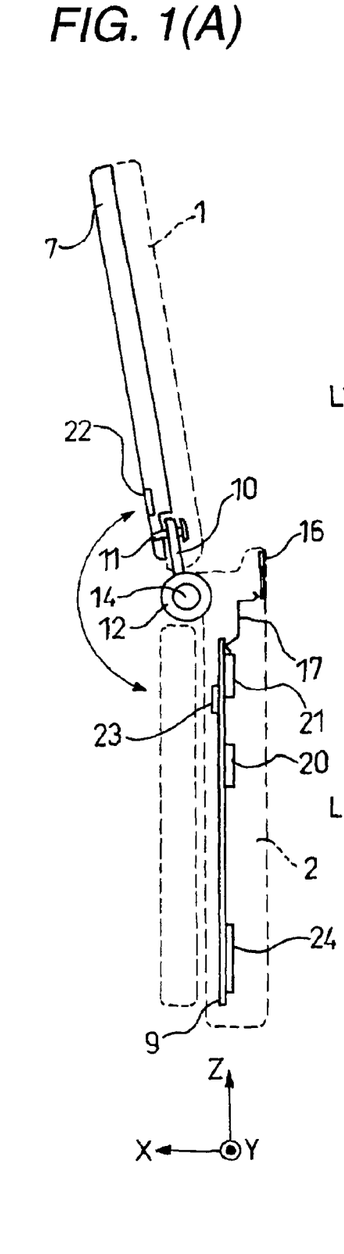
FIG. 1 is a view illustrating the basic configuration of a portable wireless apparatus with bodies open according to a first embodiment.
Figure 1B:
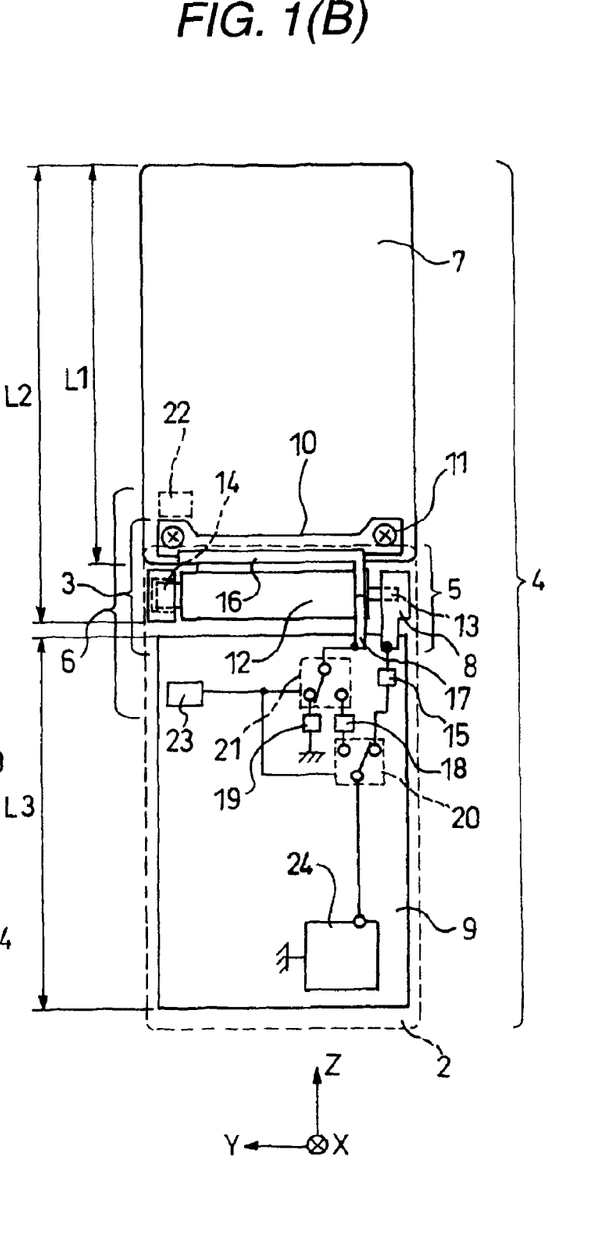
Figure 2A:
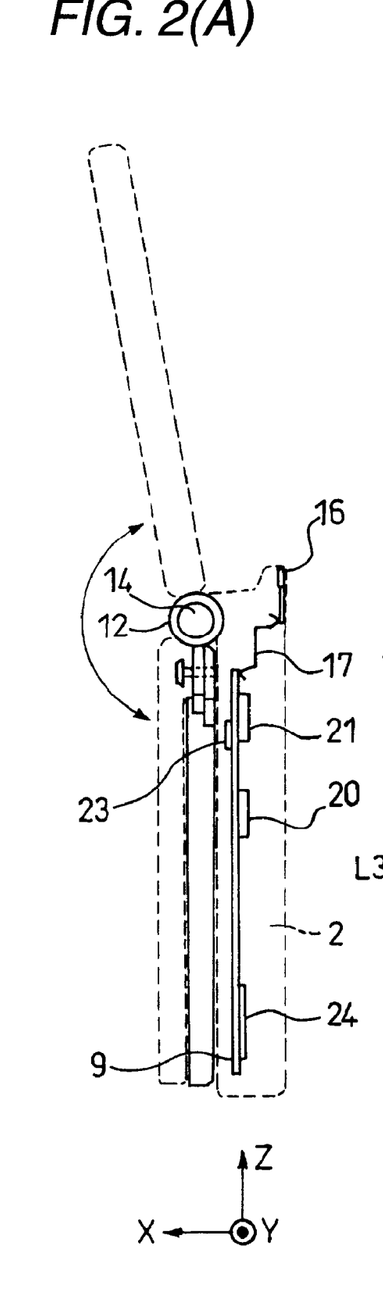
FIG. 2 is a view illustrating the basic configuration of a portable wireless apparatus with bodies closed according to a first embodiment.
Figure 2B:
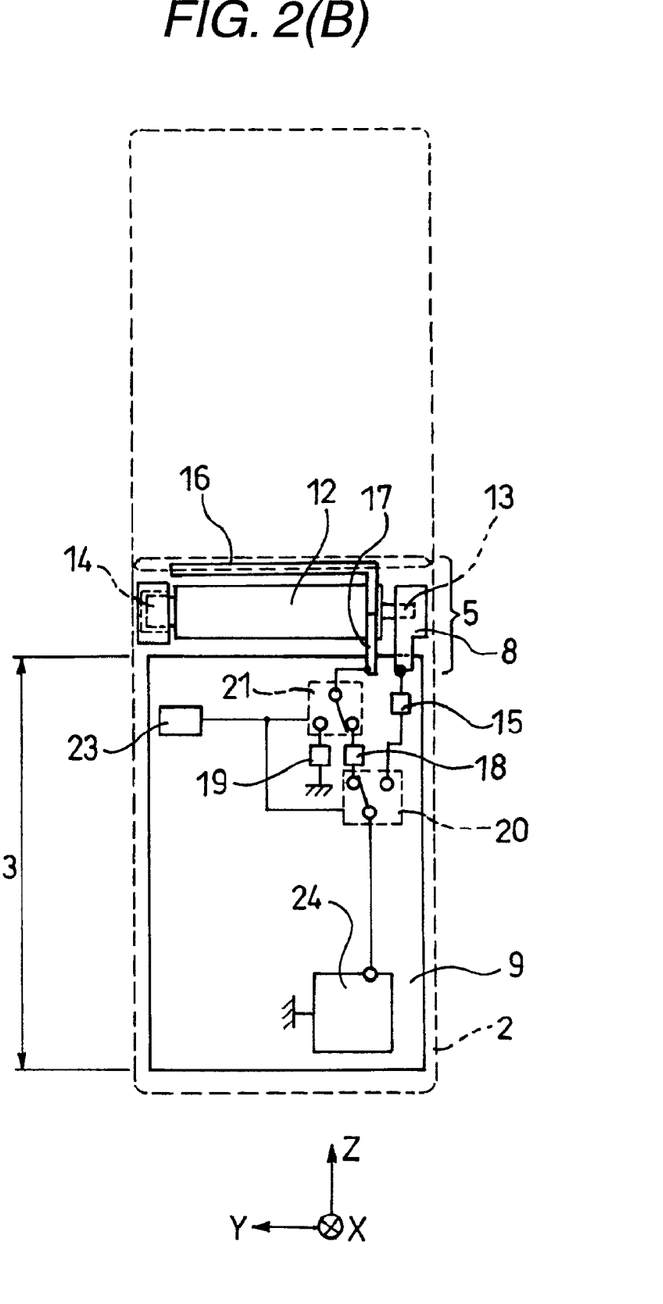
Figure 3:
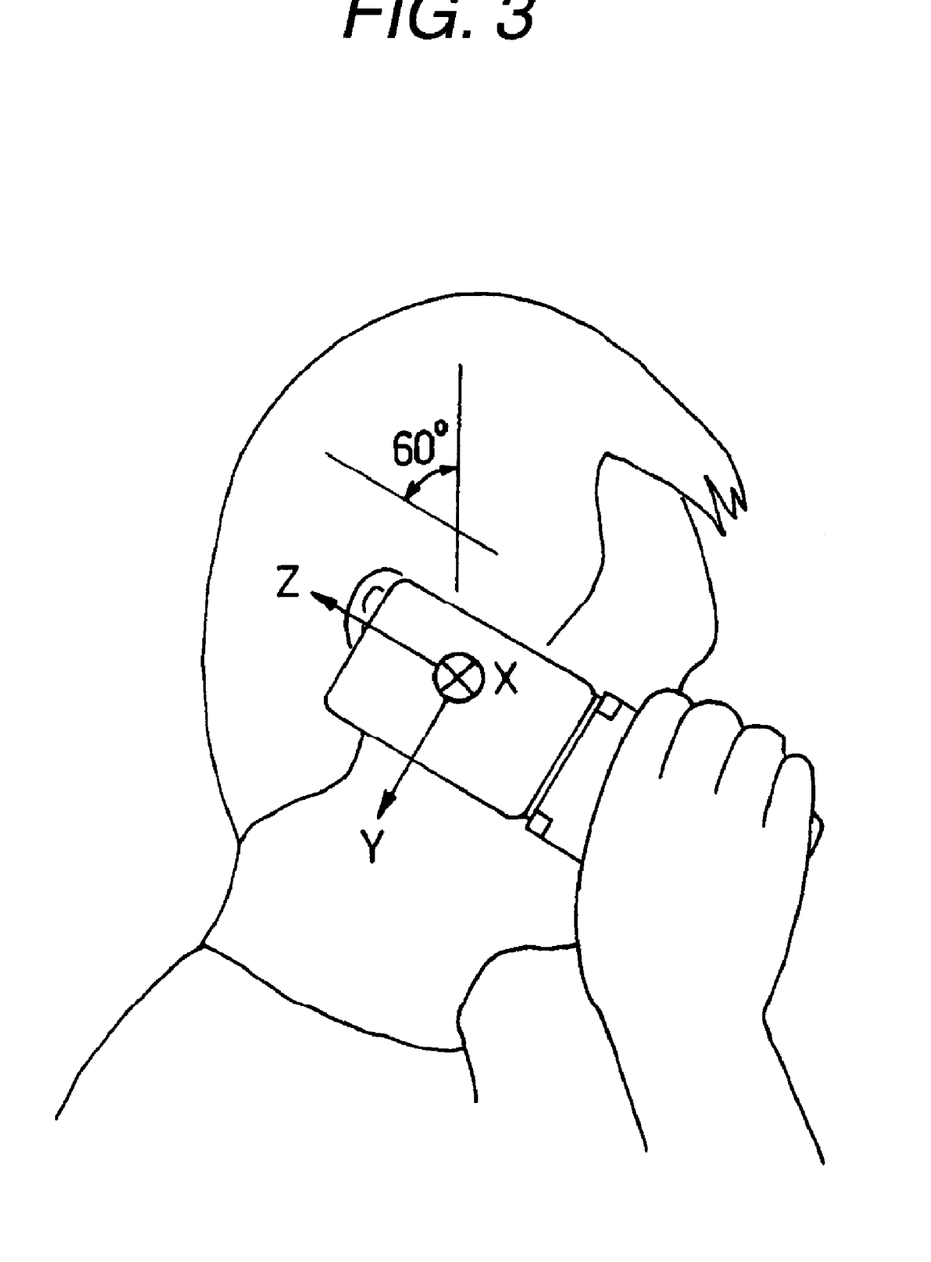
FIG. 3 is a view showing a portable wireless apparatus held in hands of a user for telephone conversation.

FIG. 1 is a view illustrating the configuration of a portable wireless apparatus with bodies open according to a first embodiment of the invention, FIG. 2 is a view illustrating the configuration of a portable wireless apparatus with bodies closed according to the first embodiment of the invention, and FIG. 3 is a view showing a portable wireless apparatus held in hands of a user for telephone conversation, in which the user holds the portable wireless apparatus that is open, at the left ear, with the right hand.

As shown in FIGS. 1 and 2, a portable wireless apparatus according to the first embodiment has an upper housing 1 that is a first housing, and a lower housing 2 that is a second housing, which are pivotably connected by a hinge portion 3. The upper housing 1 is provided with a metal frame 7 that is a part of a first antenna 4 that is a first antenna element and the lower housing 2 includes a second antenna element 16, a circuit board 9 with a gland pattern, and a second power feeding clasp 17 that is a second power feeding portion mounted at an end of a the second antenna element 16.

The hinge portion 3 includes a hinge clasp 10 that is a first hinge portion made of an electrical conductive metal, a rotary shaft 13 that is a second hinge portion, and a cylindrical conductor 12 that is a connecting portion that electrically connects the hinge clasp 10 and the rotary shaft 13, pivotably supporting them. The cylindrical conductor 12 is disposed to the upper housing 1 and electrically connected with the hinge portion-sided end the metal frame 7. Further, the rotary shaft 13 is disposed at a predetermined distance from the gland pattern on the circuit board 9 in the lower housing 2 and provided with a first power feeding clasp 8, a first power feeding portion.

Further, the portable wireless apparatus includes an antenna switching circuit 20 that selectively connects one of the first antenna 4 that is the first antenna element and the second antenna element 16 with a wireless circuit 24, a resonance circuit 19 and a second matching circuit 18 that is a matching circuit, which are selectively connected to the second antenna element 16, a switching circuit 21 that selectively connects the second power feeding clasp 17 with one of the resonance circuit 19 and the second matching circuit 18, and a permanent magnet 22 and a hall element that is included in an open/close detecting unit 6 that detects open/close of the upper housing 1 and the lower housing 2.

When the upper housing 1 and the lower housing 2 are opened, as shown in FIG. 1, the antenna switching circuit 20 selects the first antenna 4 while the switching circuit 21 selects the resonance circuit 19. On the contrary, when the upper housing 1 and the lower housing 2 are closed, as shown in FIG. 2, the antenna switching circuit 20 selects the second antenna element 16 while the switching circuit 21 selects the second matching circuit 18, so that power is supplied through the second matching circuit 18.

The configuration of the first antenna 4 is described hereafter. As shown in FIG. 1, the metal frame 7 is positioned at the +X side, i.e. the side where a display is generally disposed, in the upper housing 1.

The metal frame 7 may be made of a metal which has a high electrical conductivity and which is light with a high strength, such as a magnesium alloy. Therefore, while the strength is ensured for the upper housing 1 formed in a thin plate shape, the metal frame 7 also operates as the first antenna element.

The length L1 of the long side of the metal frame 7 is, for example, about 90 mm. The metal frame 7 and the hinge clasp 10 are fastened to the upper housing 1 by fixing screws 11, so that the metal frame 7 and the hinge clasp 10 are electrically connected, and the upper housing 1 and the hinge clasp 10 are mechanically fixed.

As shown in FIG. 1, the cylindrical conductor 12 of the hinge portion 3 is made of an electrical conductive material in a cylindrical shape, and the cylindrical conductor 12 and the hinge clasp 10 are mechanically and electrically connected. Further, the cylindrical conductor 12 and the rotary shaft 13 are also mechanically and electrically connected. The rotary shaft 13 is rotatably supported by the first power feeding clasp 8, for example, through a bearing and electric connection is ensured between the rotary shaft 13 and the first power feeding clasp 8. On the other hand, a support shaft 14 is a resin mold and the left end of the cylindrical conductor 12 is rotatably supported to the lower housing 2 by the support shaft 14.

Since the hinge portion 3 has the above configuration, the upper housing 1 and the lower housing 2 are relatively pivotably supported while electric connection is made from the metal frame 7 to the first power feeding clasp 8. Further, for example, the metal frame 7 having the length L1 of about 90 mm is supplied with electricity from the first matching circuit 15 through the hinge portion 3, and first antenna 4 operates as a kind of a dipole antenna that is composed of the circuit board 9 having a length L3 of about 90 mm, the hinge portion 3 having a length L2 of 110 mm, and the metal frame 7. The first power feeding clasp 8 may be connected to the first matching circuit 15 on the circuit board 9 disposed inside the lower housing 2, for example, by screws or soldering.

The first matching circuit 15 matches the impedance of the first antenna 4 with the input impedance (generally 50Ω) of the wireless circuit 24 and is connected to the antenna switching circuit 20. The circuit board 9 is a printed circuit board equipped with circuit components that allow a variety of functions of the portable wireless apparatus and the gland pattern (not shown) having a ground potential is formed on the substantially entire surface.

The configuration of the second antenna 5 is described hereafter.

The second antenna element 16 is disposed adjacent to the power feeding point of the first antenna 4 of the lower housing 2, i.e., in Z-direction, and positioned on the opposite side to the human housing that is slightly spaced from the human housing, i.e., −X-sided surface, in telephone conversation as shown in FIG. 3. Further, an end of the second antenna element 16 is connected with the second power feeding clasp 17, for example, by screws or soldering and the other end is open. The second power feeding clasp 17 is connected to a pattern connected with the switching circuit 21 on the circuit board 9 disposed in the lower housing 2 by screws or soldering.

The second matching circuit 18 matches the impedance of the second antenna 5 with the input impedance (generally 50Ω) of the wireless circuit 24 and adjusts the resonant frequency to the first frequency in a transmitting bandwidth and the second frequency in bandwidth a receiving frequency, with the second antenna 5 connected. Further, an end of the second matching circuit 18 is connected to the antenna switching circuit 20 and the other end is connected to the switching circuit 21.

The resonance circuit 19 changes the resonant frequency when the second antenna 5 is connected, and adjusts the resonant frequency into the transmitting bandwidth, of which an end is connected to the antenna switching circuit 20 and the other end is connected to the gland pattern of the circuit board 9.

The antenna switching circuit 20 is connected to the wireless circuit 24 through one of the first antenna 4 and the second antenna 5 and performs a switching control on the basis of the detected results by the permanent magnet 22 and the hall element 23 of the housing open/close detecting unit 6 including GaAs switch etc.

The switching circuit 21 selectively connects the second power feeding clasp 17 to one of the resonance circuit 19 and the second matching circuit 18 on the basis of the detected results by the housing open/close detecting unit 6, and preferably configured in the type of a pin diode.

The housing open/close detecting unit 6 that detects open/close of the upper housing 1 and the lower housing 2 is composed of the hall element 23 disposed on the circuit board 9 and the permanent magnet 22 disposed in a notch of the metal frame 7, and the bodies 1 and 2 are disposed such that they face each other in the opened posture. A magnetic field generated by the permanent magnet 22 is detected by the hall element 23 and notified to the antenna switching circuit 20 and the switching circuit 21.

The wireless circuit 24 has a function of transmitting and receiving in the portable wireless apparatus and disposed on the circuit board 9, and the transmitting/receiving input/output are connected to the antenna switching circuit 20.

The operation of the folding type and portable wireless apparatus is described hereafter.

The housing open/close detecting unit 6 detects open/close of the housing differences in magnetic filed detected by the hall element 23 that is obtained by differences in distance the permanent magnet 22 and the hall element 23 when the bodies 1 and 2 are open and closed.

First, it is described with reference to FIG. 1 that the housing open/close detecting unit 6 detects the bodies 1 and 2 open. The first matching circuit 15 connected with the first antenna 4 is connected to the wireless circuit 24 through the antenna switching circuit 20. The second antenna 5 is connected to the resonance circuit 19 through the switching circuit 21. The resonant frequency of the second antenna 5 and the resonance circuit 19 is at the transmitting frequency. Accordingly, the antenna current in the transmitting bandwidth that flows to the first antenna 4 is separated to the second antenna 5.

In general, current distribution corresponds to the above the local average SAR, and it has been known that the local average SAR reaches the highest value when the highest point of the antenna current is concentrated on one point and the highest point is positioned adjacent to a human housing. It is possible to reduce the local average SAR by separating the antenna current distribution to two points and spacing the highest point of the antenna current from the human housing.

Further, the antenna current that flows in the second antenna 5 with the highest point of the antenna current spaced from the human housing is increased by adjusting the resonant frequency of the second antenna 5 into the transmitting bandwidth, so that the antenna current that flows in the first antenna 4 with the highest point of the antenna current positioned relatively adjacent to the human housing is decreased and the local average SAR is reduced accordingly.

It is described with reference to FIG. 2 that the housing open/close detecting unit 6 detects the bodies 1 and 2 closed. The second antenna 5 is connected to the second matching circuit 18 through the switching circuit 21. The second matching circuit 18 is connected to the wireless circuit 24 through the antenna switching circuit 20. The resonant frequency of the second antenna 5 and the resonance circuit 19 is at the transmitting frequency and the receiving frequency. Accordingly, it is possible to ensure high performance for the antenna at the transmitting frequency and the receiving frequency.

As described above, according to the portable wireless apparatus of the embodiments of the invention, when the bodies 1 and 2 are open, the antenna switching circuit 20 selects the first antenna 4 and the first antenna 4 is connected to the wireless circuit 24 while the switching circuit 21 selects the resonance circuit and the second antenna 5 is connected to the resonance circuit 19. Further, when the bodies 1 and 2 are closed, the antenna switching circuit 20 selects the second antenna 5 and the second antenna 5 is connected to the wireless circuit 24 while the switching circuit 21 selects the second matching circuit 18 and power is supplied through the second matching circuit 18. Therefore, in the built-in antenna of the housing, it is possible to separate the antenna current and reduce the local average SAR with a high antenna gain.

Further, the first power feeding clasp 8 and the metal frame 7 may be disposed in a capacity coupling, in which the material for the hinge clasp 10 and the cylindrical conductor 12 is not limited, and for example, a resin may be used.

Further, the second antenna 5 and the power feeding element are not limited in shape and position and it may be preferable to separate the antenna current to the back of a human housing.

Further, for the connection with the circuit board 9, the resonance circuit 19 may be connected with the power feeding point of the first antenna 4 and the first matching circuit 15, or the antenna current may be separated to the second antenna 5 through the capacity coupling.

Further, it may be preferable for the resonance circuit 19 and the second matching circuit 18 to use a part of circuit in common, in which it may be preferable to control the resonant frequency using a capacity-variable diode.

This application claims priority from Japanese Patent Application (Application No. 2005-025007) filed on Feb. 1, 2005, the disclosure of which is incorporated herein by reference in its entirety.

INDUSTRIAL APPLICABILITY

According to the above description, a portable wireless apparatus according to the invention, it is possible to separate an antenna current and reduce the local average SAR when the housing is closed, while it is possible to obtain a high antenna gain when the housing is open. In a folding type mobile phone having an open/close mechanism that is achieved by connecting an upper housing and a lower housing through a hinge portion, it is possible to reduce the local average SAR (Specific Absorption Rates) while obtaining a high antenna gain.

The invention claimed is:

1. A portable wireless apparatus, in which:
a first housing and a second housing are pivotably connected by a hinge portion;
the first housing includes a first antenna element;
the second housing includes a second antenna element, a circuit board having a gland pattern, and a second power feeding portion provided at an end of the second antenna element; and
the hinge portion includes a first hinge portion and a second hinge portion that are made of an electrical conductive metal and a connecting portion that electrically connects the first hinge portion with the second hinge portion and rotatably supports the first and second hinge portions, the first hinge portion being electrically connected to the hinge portion-sided end of the first antenna element of the first housing, and the second hinge portion being disposed at a predetermined distance from the gland pattern on the circuit board of the second housing and provided with a first power feeding portion;
wherein the portable wireless apparatus comprises:
an antenna switching circuit that selectively connects one of the first antenna element and the second antenna element to a wireless circuit;
a resonance circuit and a matching circuit that are selectively connected to the second antenna element;
a switching circuit that connects the second power feeding portion with one of the resonance circuit and the matching circuit; and
an open/close detecting unit that detects an open/close state of the first housing and the second housing;

wherein the antenna switching circuit selects the first antenna element while the switching circuit selects the resonance circuit, in case such that the first housing and the second housing are opened; and wherein the antenna switching circuit selects the second antenna element while the switching circuit selects the matching circuit and power is supplied through the matching circuit, in case such that the first housing and the second housing are closed.

2. The portable wireless apparatus according to claim 1, wherein the resonance circuit is set such that the second antenna element connected with the resonance circuit resonates in a first frequency bandwidth, in case such that the first housing and the second housing are opened, and wherein the matching circuit is set such that the second antenna element resonates in the first frequency bandwidth and a second frequency bandwidth, in case such that the first housing and the second housing are closed.

3. A portable wireless apparatus having an open state and a closed state, comprising:

a first housing operatively coupled to a second housing, wherein the first housing includes a first antenna element and the second housing includes a second antenna element;

a resonance circuit;

a first matching circuit and a second matching circuit;

an antenna switching circuit; and a switching circuit;

wherein the antenna switching circuit selectively connects the first antenna element to the first matching circuit, and the switching circuit selectively connects the second antenna element to the resonance circuit when the first housing and the second housing are in the open state; and wherein the antenna switching circuit and the switching circuit selectively connect the second antenna element to the second matching circuit when the first housing and the second housing are in the closed state.

* * * * *